(12) United States Patent
Dupuis et al.

(10) Patent No.: US 7,651,332 B2
(45) Date of Patent: Jan. 26, 2010

(54) FUNCTIONAL AND ANATOMICAL DELIVERY SIMULATOR

(75) Inventors: Olivier Dupuis, Lyons (FR); Maurice Betemps, Villeurbanne (FR); Georges Delhomme, Saint Laurent de Mure (FR); André Dittmar, Lyons (FR); Hervé Tanneguy Redarce, Lyons (FR); Ruimark Creazzola Silveira, Villeurbanne (KR)

(73) Assignees: Centre National de la Recherche Scientifique, Paris (FR); Institute National des Sciences Appliquees de Lyon, Villeurbanne (FR); Les Hospices Civils de Lyon, Lyons (FR)

( * ) Notice: Subject to any disclaimer, the term of this patent is extended or adjusted under 35 U.S.C. 154(b) by 275 days.

(21) Appl. No.: 11/677,204

(22) Filed: Feb. 21, 2007

(65) Prior Publication Data

US 2007/0218442 A1    Sep. 20, 2007

Related U.S. Application Data

(63) Continuation of application No. 10/566,700, filed as application No. PCT/FR2004/050372 on Jul. 30, 2004, now abandoned.

(30) Foreign Application Priority Data

Aug. 1, 2003    (FR) .................................. 03 09569

(51) Int. Cl.
G09B 23/28    (2006.01)

(52) U.S. Cl. ...................................... 434/262; 434/273
(58) Field of Classification Search ................. 434/262, 434/273
See application file for complete search history.

(56) References Cited

U.S. PATENT DOCUMENTS

| | | | | |
|---|---|---|---|---|
| 3,822,486 A | * | 7/1974 | Knapp et al. ................. | 434/273 |
| 3,824,709 A | * | 7/1974 | Knapp et al. ................. | 434/273 |
| 3,826,019 A | * | 7/1974 | Knapp et al. ................. | 434/273 |
| 4,411,629 A | * | 10/1983 | Voights ....................... | 434/266 |
| 4,907,973 A | * | 3/1990 | Hon ........................... | 434/262 |
| 5,509,810 A | * | 4/1996 | Schertz et al. .............. | 434/262 |
| 6,238,215 B1 | * | 5/2001 | Jurmain et al. .............. | 434/270 |
| 6,503,087 B1 | * | 1/2003 | Eggert et al. ................. | 434/262 |
| 7,241,145 B2 | * | 7/2007 | Riener et al. ................ | 434/262 |

* cited by examiner

Primary Examiner—Cameron Saadat
(74) Attorney, Agent, or Firm—MH2 Technology Law Group LLP

(57) ABSTRACT

A delivery simulator may include a fetal system comprising at least a fetal head. The fetal system may be configured to simulate the behavior of at least one part of a fetus, a maternal system configured to simulate the behavior of at least one part of a mother's body interacting with the fetus, and a device for establishing the position of at least one point of the fetal head. The device may include at least one marker element positioned on the fetal head, and at least one fixed element linked to said marker element and placed at a distance from the fetal head.

15 Claims, 4 Drawing Sheets

FUNCTIONAL AND ANATOMICAL DELIVERY SIMULATOR

Figure 1:
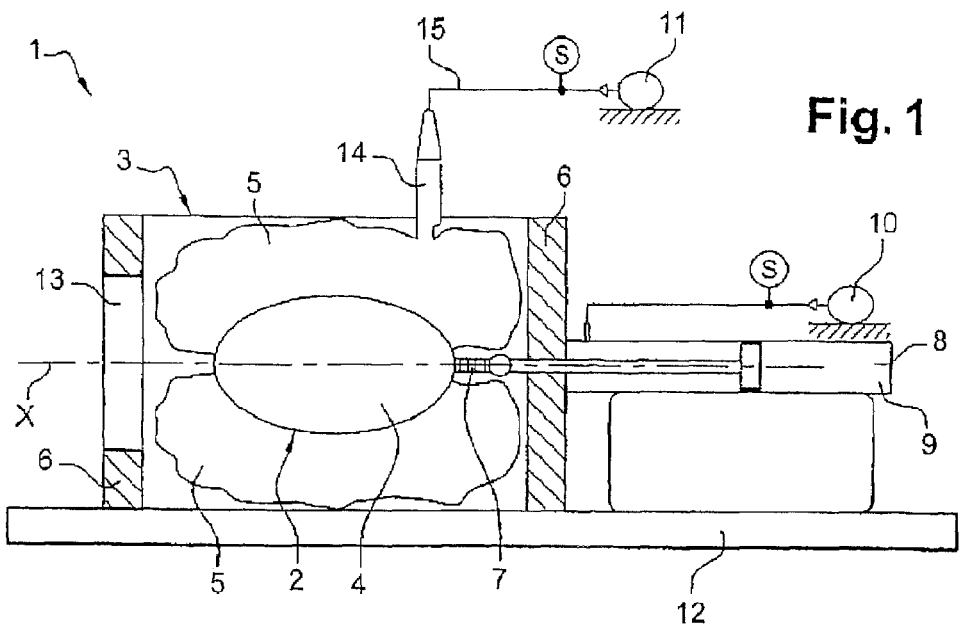

This application is a continuation of application Ser. No. 10/566,700 now abandoned, filed on Feb. 1, 2006, which claims priority to National Phase application PCT/FR2004/050372, filed Jul. 30, 2004, which claims benefit of French application 03 09569, filed Aug. 1, 2003.

The present invention relates to a delivery simulator.

International application WO 03/001482 describes a simulator comprising an actuator designed to simulate the movements of the fetus in the uterus during delivery.

There is a need for an improved delivery simulator that facilitates and improves training in the procedures and techniques of obstetrics, and in the diagnostic and therapeutic procedures of delivery, making it possible to prepare parturient women for delivery and to test and validate the clinical procedures or the instruments used in certain types of delivery.

Simulator Comprising at Least one Membrane Subjected to the Pressure of a Fluid According to a first of its aspects, the subject of the invention is a delivery simulator which can be characterized in that it comprises:

a fetal system designed to simulate the behavior of at least one part of a fetus during delivery, a maternal system designed to simulate the behavior of at least one part of the mother's body interacting with the fetus, this maternal system comprising at least one membrane subjected to the pressure of a fluid.

The membrane or membranes of the maternal system can be made of a flexible and deformable material and permit simulation of the behavior of the mother's muscles or internal cavities, in particular the muscles of the pelvis, of the uterus and of the bladder, or others too.

The simulator can comprise a pneumatic or hydraulic device designed to subject the membrane or membranes of the maternal system to a predetermined pressure during a delivery simulation, by conveying a fluid into said membrane or membranes.

The pressure of the fluid can vary during the simulation. In particular, during labor and/or expulsion, contractions of the uterus are produced and an abdominal pressure may be exerted. In the case where one or more membranes are designed to simulate the behavior of the uterus, the pressure to which said membrane or membranes is or are subjected may vary greatly, in particular with pressure peaks in order to simulate each contraction of the uterus and/or each abdominal pressure, and also dilation of the cervix.

The fetal system preferably comprises at least a fetal head which can be made of a semi-rigid, deformable material and have a morphology similar to the cranium of a fetus. The fetal system can also comprise a fetal body.

In addition to the membrane or membranes, the maternal system can comprise a part simulating a pelvis.

The maternal and fetal systems are preferably made of biomimetic materials.

The maternal system and the fetal system can be designed in such a way as to be interchangeable with other maternal and fetal systems, so as to permit training in delivery using different morphologies of maternal and fetal systems.

Simulator Comprising a Device for Establishing the Position of at Least One Point of the Fetal Head and/or of an Obstetrics Instrument According to another of its aspects, independent of or in combination with the preceding one, the subject of the invention is a delivery simulator which can be characterized in that it comprises:

a fetal system comprising at least a fetal head, this fetal system being designed to simulate the behavior of at least one part of a fetus, a maternal system designed to simulate the behavior of at least one part of the mother's body interacting with the fetus, and a device for establishing the position of at least one point, preferably the position of at least two or three points, or the whole, of the fetal head and/or of at least one obstetrics instrument.

Thus, it is possible to follow the changes in position of the fetal head and/or of the obstetrics instrument during a delivery simulation, in real time.

"Position of the fetal head" is understood to mean at the same time its position in space, relative to the maternal system, but also its orientation in space relative to the maternal and fetal systems.

The obstetrics instrument can be a forceps, a suction cup, or a spatula, or any type of instrument for extraction or diagnosis and/or any type of obstetrics instrument.

The device for establishing the position of at least one point of the fetal head and/or of an obstetrics instrument can comprise at least one emitter or marker element positioned on the fetal head and at least one corresponding detector or fixed element linked to the marker element and placed at a distance from the fetal head, or vice versa, or any other type of sensor for locating the position of the head in space.

The emitter can generate a magnetic or electromagnetic field, for example.

The device for establishing the position of at least one point of the fetal head and/or of at least one obstetrics instrument can also comprise at least one camera and an image analysis system. The device for establishing the position of at least one point of the fetal head and/or of at least one obstetrics instrument can in particular comprise at least two cameras designed so as to determine, by triangulation, the position of the fetal head and/or of the obstetrics instrument.

Simulator Comprising an Actuator for Exerting a Force on the Fetal Head

According to another of its aspects, independent of or in combination with the preceding one, the subject of the invention is a delivery simulator which can be characterized in that it comprises:

a fetal system comprising at least a fetal head, this fetal system being designed to simulate the behavior of at least one part of a fetus, the fetal head being connected to an actuator designed to exert a force on the fetal head, and a maternal system designed to simulate the behavior of at least one part of the mother's body interacting with the fetus.

According to this latter aspect, the delivery simulator can, by virtue of the actuator, simulate the forces exerted on the fetal head during delivery, in particular a force aiding in the expulsion of the fetus, for example during a contraction or an abdominal pressure, or an opposed force.

A physician or midwife being trained on the simulator will therefore be faced with the same forces as those that he or she would encounter during an actual delivery.

The actuator can for example comprise a hydraulic, pneumatic or electric thrustor which may or may not be controlled to afford a constant resistance to the advance or a programmed constant speed of advance. This thrustor can itself be movable in space in two or three axes, permitting modification of the axis of the thrustor.

The simulator can also comprise a device for positioning the fetal head, in particular a mechanical or electromechanical device with which it is possible to place the head in a location and with a predetermined orientation, before or at the start of a simulation.

The device for positioning the fetal head can be manually or automatically controlled. It can for example comprise a flexible tube, a hinge such as a partial or complete ball joint permitting modification, with at least one degree of freedom, of the position of the fetal head.

In the case where the simulator comprises both a device for establishing the position of at least one point of the fetal head and also a positioning device, it is possible for example to reproduce the same positioning of the fetal head at the start of each simulation, thus allowing several physicians or midwives to be placed in the same situation.

Pressure Measurement

One zone at least of the fetal system can comprise at least one pressure sensor designed to deliver information relating to the pressure exerted on this zone, by another zone of the fetal system, by the maternal system, or by a foreign element, for example a hand or an instrument.

One zone at least of the maternal system can likewise comprise at least one pressure sensor designed to deliver information relating to the pressure exerted on this zone by another zone of the maternal system, by the fetal system, or by a foreign element such as a hand or an instrument.

The simulator can comprise a pressure measurement device designed to process information delivered by said pressure sensor or pressure sensors.

An advantage in having pressure sensors disposed on the maternal and fetal systems is that it is possible to record the locations on which the physician or the midwife exerts a pressure and, if appropriate, to measure this pressure, in order to monitor the maneuvers performed, and if appropriate their sequence. During manipulation of an instrument equipped with at least one pressure sensor, it is possible in particular to monitor the pressures exerted by the instrument on the fetal head. For example, it is possible to see whether the instrument is placed on a bone or an orbit for example.

A pressure sensor can be placed on at least one zone of the maternal and fetal systems chosen from among the following: sacral promontory, right or left ischial process, innominate lines, anterior or posterior fontanelle, chin, nose, right orbit, left orbit, or another zone of clinical interest.

Among the pressure sensors, it is possible to use a sensor chosen from among the single-sensors which comprise a single point of detection, such as a strain gauge sensor, a contact sensor, a resistive ink sensor, or from among the matrix sensors which comprise between 10 and 50 detection points, such as a sensor with charged carbon, an interface pressure sensor, or others, provided they are designed to deliver information on the pressure exerted at the location where they are situated. The matrix sensors can also deliver more information concerning in particular the positioning of the hand or of the instrument.

Data Processing and Control System

The simulator advantageously comprises a processing system with which it is possible to control the various active elements of the simulator, so as to simulate a normal or pathological delivery.

The processing system can comprise computing means such as a microcomputer and the required interfaces for controlling the active elements and receiving signals and analog or digital data.

The processing system can be connected to the aforementioned actuator and can control the force which is exerted by the actuator during the simulation and which corresponds to a movement of resistance or a push.

The processing system can also be connected to the positioning device in order, for example, to control the positioning of the fetal head at the start of the simulation.

The processing system can be connected to the device for establishing the position of at least one point of the fetal head and/or of at least one obstetrics instrument and can be designed to receive and process, for example in real time, the information relating to the position, including the orientation, of the fetal head and/or of the obstetrics instrument during the simulation.

The device for measuring the interface pressure can be connected to the processing system, the latter being designed to cause the display, for example, of a graph of the pressures exerted on the fetal head.

The processing system can comprise an input device, for example a keyboard and/or a mouse, making it possible in particular to enter information relating to the simulation and/or to the person being trained on the simulator.

The simulator can also comprise at least one speaker connected to the processing system, the latter being designed to transmit audio signals to it, for example noises or cries simulating those of an actual delivery, or data or recommendations, at the start of or during the simulation, for example.

The simulator preferably comprises a display device designed to display information relating to the delivery simulation in the form in particular of continuous or intermittent images and/or light signals.

The display device can display, in real time, information on the progress of the delivery, for example one or more images or data items relating to the position of the fetal head, one or more images relating to the interface pressures exerted on one and/or the other of the maternal and fetal systems, information relating to the development of the contractions and/or the abdominal pressure.

Alternately, information relating to the development of the contractions can be shown on a paper tracing, as in an actual delivery. The paper tracing can, for example, be connected to the processing system, which can be designed to initiate tracing of the contractions as a function of the simulation.

The invention also relates to an assembly comprising a delivery simulator as defined above and an obstetrics instrument, in particular forceps, this instrument being able to be equipped with at least one pressure sensor. The obstetrics instrument can be connected to the processing system. In this case, the processing system can be designed to receive and process the information delivered by the pressure sensor or pressure sensors, in particular concerning the pressures exerted by the obstetrics instrument on the fetal system.

By virtue of the invention, a person training on the simulator is able, at no risk, to perform maneuvers with an obstetrics instrument, these maneuvers often in reality being difficult and entailing risks.

It is also possible to test out a new obstetrics instrument on the delivery simulator.

Use of the Delivery Simulator

The simulator according to the invention can also be used for preparing parturient women for delivery, by allowing them to view a simulated delivery.

The delivery simulator according to the invention can also be used to train physicians and midwives in delivery, in particular to train them in: procedures for monitoring the mother, among which mention may be made of diagnosis of the degree of dilation of the cervix, placement of instruments in the pelvic canal or uterus, such as an internal tocodyanamometer; procedures for monitoring the fetus, for example placement of a scalp electrode, saturometer, fetal pulse oximeter, or other instruments in contact with the fetus; the diagnosis of fetal presentation or diagnosis of the degree of descent of the head; manual obstetrics maneuvers, for example the Jacquemier maneuver, total breech extraction, uterine massage; obstetrics maneuvers performed using instruments, for example with the aid of a suction cup, forceps, spatulas; maneuvers performed after delivery, such as artificial expulsion of the placenta, or inspection of the uterus.

The delivery simulator according to the invention can also be used to test out new obstetrics tools or procedures.

It is also possible to use the delivery simulator according to the invention to evaluate the relevance and reproducibility of conventional clinical criteria.

Figure 3:
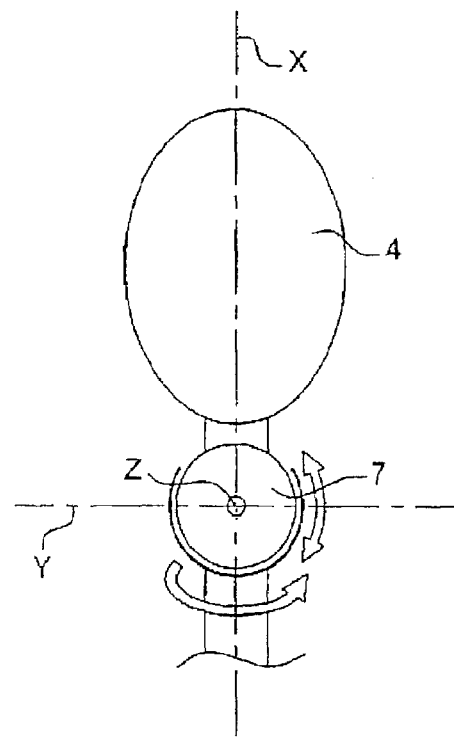
Figure 2:
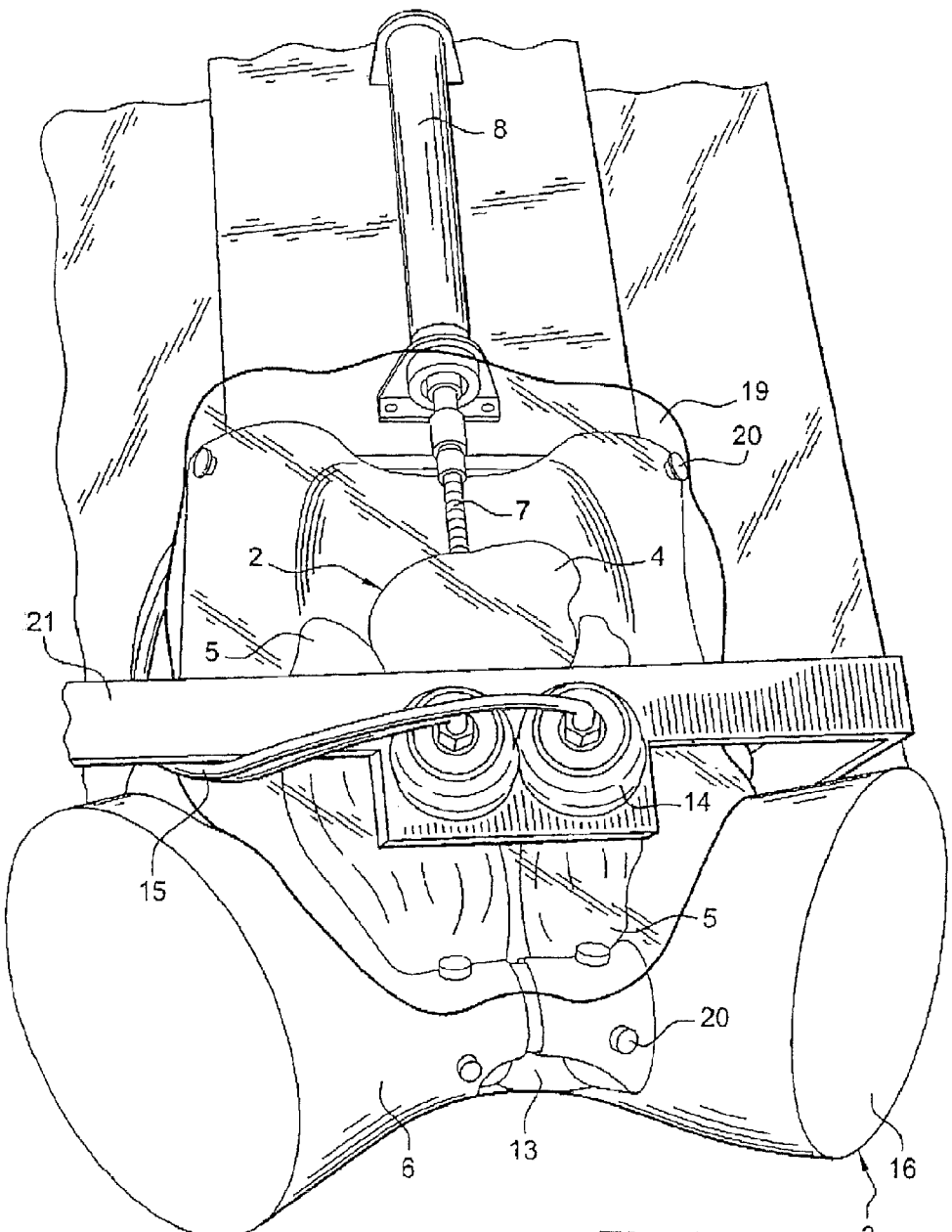
Figure 4:
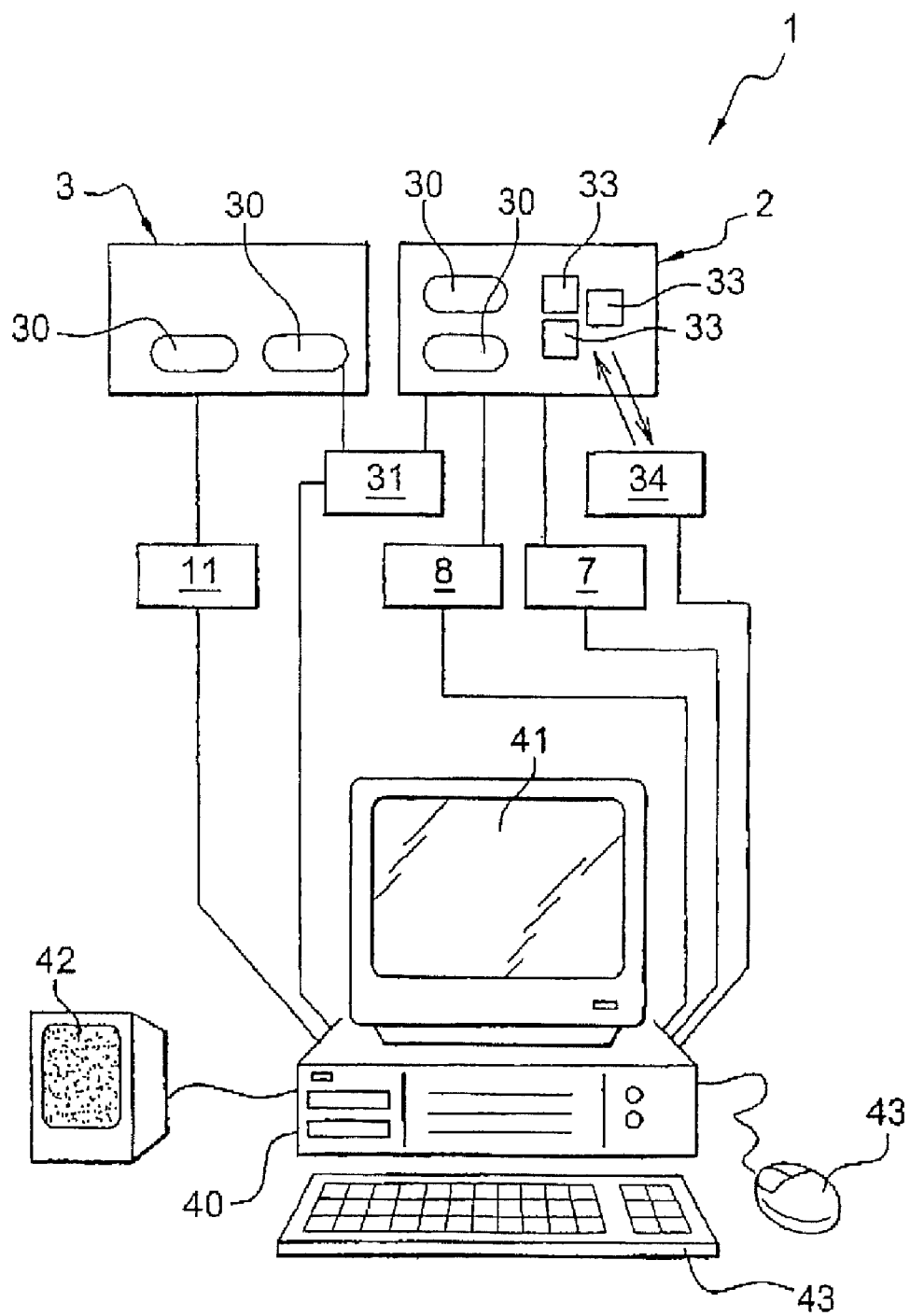
Figure 5:
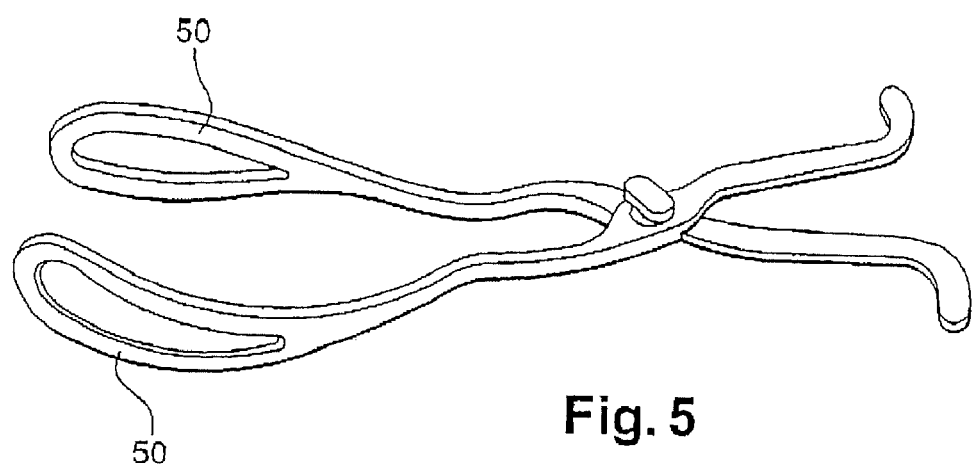
Figure 6:
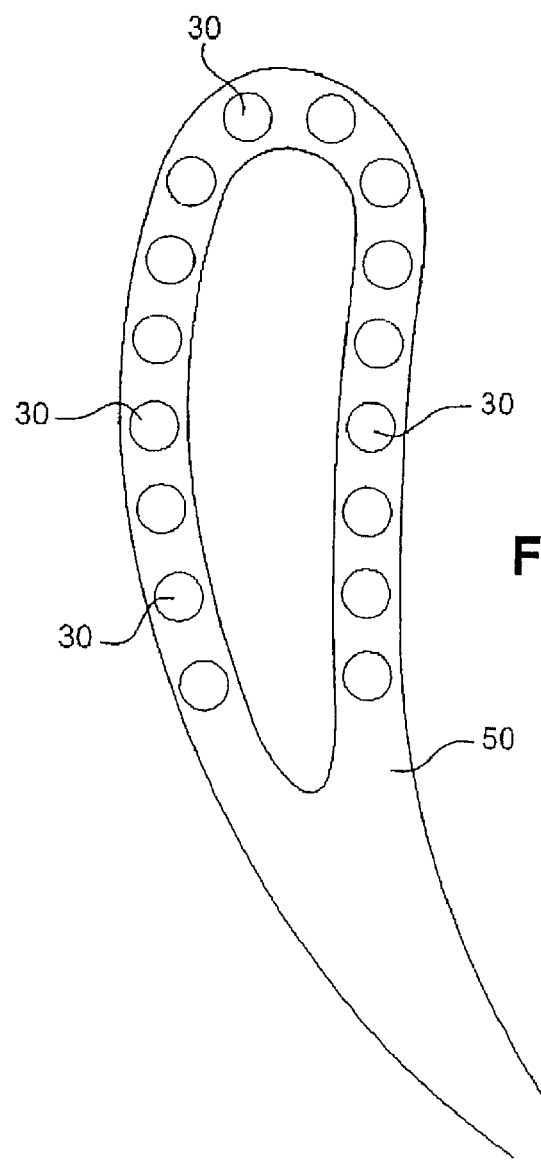

The invention will be better understood from reading the following detailed description of nonlimiting illustrative embodiments thereof and from examining the attached drawing, in which:

FIG. 1 is a schematic and partial view, in cross section, of an example of the delivery simulator according to the invention, FIG. 2 is a schematic and partial perspective view of an example of the simulator according to the invention, FIG. 3 is a schematic and partial representation of an example of a device for positioning the fetal head, FIG. 4 is a schematic representation of different constituent elements of the simulator, FIG. 5 is a schematic representation of forceps that can be used with the delivery simulator, and FIG. 6 shows a schematic and partial representation of forceps comprising a pressure sensor.

EXAMPLE OF A DELIVERY SIMULATOR

Certain constituent elements of a delivery simulator 1 according to the invention have been shown in FIGS. 1 and 2.

This simulator 1 comprises a fetal system 2 designed to simulate the behavior of at least one part of the fetus during delivery, and a maternal system 3 designed to simulate the behavior of at least one part of the mother's body interacting with the fetus.

A processing system 40, shown schematically in FIG. 4, allows the functioning of the simulator 1 to be controlled.

In the example of FIGS. 1 and 2, the fetal system 2 comprises a fetal head 4, but it can also comprise a fetal body without departing from the scope of the present invention.

In the example in question, the maternal system 3 comprises inflatable flexible membranes 5, which are two in number and which are designed to simulate the behavior of the pelvic muscles.

The maternal system 3 also comprises a part 6 designed to simulate the behavior of the female pelvis, with extensions 16 corresponding to the legs. This part 6 comprises an opening 13 through which the fetal system 2 can be expelled.

A device 7 for positioning the fetal head 4 makes it possible to modify the position of the fetal head 4 at any time. The fetal head 4 is connected, by way of the positioning device 7, to an actuator 8 that can be controlled by the processing system 40.

In the example in question, the actuator 8 comprises a pneumatic thrustor with a thrustor body 9 and a pump 10 providing the pressure necessary for operation of the thrustor.

The membranes 5 of the maternal system 3 are subjected to the pressure of a fluid, namely air in the example in question, by means of a pneumatic device 11 to which they are connected by way of respective valves 14 and a conduit 15. The pneumatic device 11 is controlled by the processing system 40 and allows a fluid to be delivered into the spaces delimited by the membranes 5 at a predefined pressure, this pressure being able to be varied during the delivery simulation, in such a way as to simulate the behavior of the mother's muscles.

The delivery simulator 1 rests on a support 12 which can be a table, for example.

The positioning device 7 is designed to allow the user to modify the position of the fetal head 4 as he or she wishes, particularly at the start of a delivery simulation.

The positioning device 7 can be controlled manually or automatically. In the case of automatic control, this can be effected via the processing system 40.

The actuator 8 is designed to exert a force on the fetal system 2 countering the expulsion of the fetal system or, by contrast, aiding in the expulsion, so as to simulate the real forces exerted on a fetus during delivery, and in particular during uterine contractions or abdominal pressures.

The actuator 8 can also permit displacement of the fetal head in a longitudinal axis X coinciding with that of the opening 13 in the example in question.

It will be seen from FIG. 2 that the valves 14 of the pneumatic device 11 are carried by a support 21 arranged above the membranes 5 so as not to impair the quality of the simulation.

The fetal head 4 has a morphology and texture similar to those of the cranium of a fetus, being made preferably from a semi-rigid, deformable material. The membranes 5 and the fetal system 4 are covered by a flexible apron 19 which is made of transparent polymer and is fixed by fasteners 20 to the part 6 corresponding to the mother's pelvis. In an alternative not shown here, this apron 19 can be opaque and/or simulate the behavior of the mother's abdomen.

The maternal system 3 and fetal system 2 can be exchanged with others corresponding to different morphologies (not shown).

The number of membranes 5 can be greater than two, additional membranes being able to be arranged in such a way as to also simulate the uterus and the bladder, among others. The membrane 5 simulating the pelvic muscles extends into the opening 13.

The device 7 for positioning the fetal head 4 can be designed in different ways.

The positioning device 7 can comprise a flexible tube, as is illustrated in FIG. 1. It can also comprise a ball joint connection or the like.

By way of example, a ball joint has been shown in FIG. 3 connected to the fetal head 4.

The ball joint makes it possible to modify, with several degrees of freedom, the positioning of the fetal head 4. It permits in particular the rotation about an axis Z orthogonal to the plane of the figure, and about the longitudinal axis X or the axis Y perpendicular to the axis X in the plane of the figure.

The maternal system 3 and the fetal system 2 can each comprise one or more pressure sensors 30, as is illustrated very schematically in FIG. 4.

These sensors 30 are connected to a pressure measurement device 31 designed to receive and process the information delivered by the sensors 30.

The pressure sensors 30 can be arranged on at least one of the following zones of the maternal system or of the fetal system: the sacral promontory, the right or left ischial process, the innominate lines, the anterior or posterior fontanelle, the chin, the nose, the right orbit or the left orbit.

The pressure sensors 30 can be of the single-sensor type, for example a strain gauge sensor or contact sensor, or a resistive ink sensor or a matrix-type sensor, for example carbon charged sensor or interface pressure sensor.

Other types of pressure sensors 30 can be used on the maternal and fetal systems without departing from the scope of the present invention. The sensors 3 can also be tactile sensors or others without departing from the scope of the invention.

The fetal system 2 can also comprise one or more elements 33 for locating the position of the fetal head and/or of an obstetrics instrument, such as forceps.

A device 34 for establishing the position of at least one point of the fetal head and/or of an obstetrics instrument allows the position of the marker elements 33 to be determined. These marker elements 33, of which there are three in the illustrated example, can for example each comprise an emitter of a radiofrequency signal, and the device 34 can comprise one or more corresponding detectors.

In an alternative not shown here, the device 34 for establishing the position of at least one point of the fetal head and/or of an obstetrics instrument can comprise at least two cameras designed to determine, by triangulation, the position of the fetal head and/or of the obstetrics instrument, the marker elements 33 comprising, for example, light emitters or reflecting parts.

When there is more than one marker element 33, it is possible to obtain information on the orientation of the fetal head and/or of the obstetrics instrument, or even to establish the orientation of the fetal head and/or of the obstetrics instrument if the marker elements are numerous.

The processing system 40 can comprise a microcomputer or similar, and it also controls a display device 41, a speaker 42 and an input device 43.

The processing system 40 receives and processes information originating from the pressure measurement device 31 and from the device 34 for establishing the position of at least one point of the fetal head and/or of an obstetrics instrument.

The processing system 40 is also designed, as mentioned above, to control the respective actions of the device 7 for positioning the fetal head, the actuator 8, and also the pneumatic device 11.

When a person uses the input device 43 to enter data concerning a simulation to be effected, and in particular orders the processing system 40 to start a predefined simulation, said processing system brings the fetal head 4 to a predetermined position, causes filling of the spaces delimited by the membranes 5 to a predetermined pressure and, by means of the actuator 8, applies a predetermined force to the fetal head 4.

During the simulation, the processing system 40 will cause the display device 41 to show information relating to the simulation and will, for example, indicate if the actions exerted by the person training on the simulator are correct.

The display device 41 can display an image or data relating to the position of the fetal head, for example 3D images of the fetal head, and/or information on the pressures exerted on the zones on which the pressure sensors 30 are placed.

The display device 41 can also be designed to display information relating to the development of the contractions and/or the abdominal pressure and/or the dilation of the cervix, in particular graphs for monitoring in real time the contractions and/or abdominal pressure and/or dilation of the cervix.

The display device 41 can include a screen, for example a computer screen or video projector, and can be arranged alongside, above or behind the maternal and fetal systems.

The speaker 42 can output advice from a trainer or noises simulating those of a delivery.

The processing system 40 can also be designed to evaluate the physician or midwife at the end of a delivery simulation exercise, by displaying a mark or assessment.

The simulator may or may not include an instrument, for example obstetrical forceps.

Certain delivery simulations, for example stored in the memory of the processing system, may require the use of obstetrics instruments, in particular forceps, whose use entails risks for the fetus.

The delivery simulator according to the invention permits the use of obstetrics instruments.

The training in the use of the obstetrics instruments on the delivery simulator may reduce the risks during an actual delivery.

FIG. 5 shows forceps that can be used with the delivery simulator according to the invention, said forceps being of one of the types used in actual deliveries.

The forceps comprises two symmetrical blades 50 which bear on the fetal head. To control the manipulation of the forceps by the obstetrician, they can be equipped on one blade 50 at least, as illustrated in FIG. 6, with at least one pressure sensor 30.

The pressure sensor or pressure sensors 30 can be placed on the inner and/or outer faces of each of the blades 50. Different types of pressure sensors 30 can be used on instruments without departing from the scope of the present invention in the manner of those that can be used on the maternal and fetal systems. It may be advantageous, however, to use a matrix sensor, as illustrated.

The use of forceps equipped with at least one pressure sensor makes it possible in particular to monitor the symmetry of the pressures exerted by the blades on the fetal head 4, to detect in real time the soft points, constituted for example by the orbits of the fetal head, and the hard points constituted by the bones.

The invention is not limited to the examples that have just been described.

In particular, other obstetrics instruments equipped if appropriate with pressure sensors can be used during a simulation.

The device for positioning of the fetal head 4 may also be different.

The fetal system can also comprise a fetal body in addition to the fetal head.

In the whole of the description, including the claims, the expression "comprising a" is to be understood as being a synonym of the expression "comprising at least one" unless otherwise specified.

The invention claimed is:

1. A delivery simulator comprising:
   a fetal system comprising at least a fetal head, said fetal system being configured to simulate the behavior of at least one part of a fetus, the fetal head being connected to an actuator configured to exert a force on the fetal head;
   a maternal system configured to simulate the behavior of at least one part of a mother's body interacting with the fetus, the maternal system containing the fetal system; and a device that positions at least one point of the fetal head with respect to the maternal system, the device comprising:
- at least one emitter element positioned on the fetal head, and
- at least one corresponding detector for receiving information on the position of the fetal head from said emitter, the detector being placed at a distance from the fetal head.

2. The simulator according to claim 1, wherein the fetal head is made of a semi-rigid, deformable biomimetic material.

3. The simulator according to claim 1, wherein the fetal system further comprises a fetal body.

4. The simulator according to claim 1, wherein the maternal system comprises at least one membrane made of a flexible and deformable biomimetic material.

5. The simulator according to claim 1, wherein the maternal system comprises a part simulating the behavior of a female pelvis.

6. The simulator according to claim 1, further comprising a device for positioning the fetal head.

7. The simulator according to claim 6, wherein the device for positioning the fetal head comprises one of a mechanical and electromechanical device.

8. The simulator according to claim 1, wherein at least one zone of the fetal system comprises at least one pressure sensor configured to deliver information relating to the pressure exerted on said zone.

9. The simulator according to claim 1, wherein the maternal system comprises at least one membrane subjected to a fluid pressure.

10. The simulator according to claim 9, further comprising one of a pneumatic and a hydraulic device configured to subject the at least one membrane of the maternal system to a predetermined pressure during a delivery simulation.

11. An assembly comprising:
the delivery simulator according to claim 1; and
an obstetrics instrument.

12. An assembly according to claim 11, wherein the obstetrics instrument includes forceps.

13. An assembly according to claim 11, wherein the obstetrics instrument comprises at least one pressure sensor.

14. An assembly according to claim 11, wherein it comprises a device for establishing the position of at least one point of the obstetrics instrument with respect to the maternal system, the device comprising:
- at least one emitter element positioned on the obstetrics instrument, and at least one corresponding detector for receiving information on the position of the obstetrics instrument from said emitter, the detector being placed at a distance from the obstetrics instrument.

15. The simulator according to claim 1, wherein the device for establishing the position of at least one point of the fetal head comprises at least three emitters positioned on the fetal head to obtain information on the orientation of the fetal head.

* * * * *